(12) United States Patent
Miao et al.

(10) Patent No.: US 11,378,230 B2
(45) Date of Patent: Jul. 5, 2022

(54) HIGH-TEMPERATURE AND/OR HIGH PRESSURE GAS ENCLOSURE

(71) Applicant: UCHICAGO ARGONNE, LLC, Chicago, IL (US)

(72) Inventors: Yinbin Miao, Naperville, IL (US); Nicolas E. Stauff, Oak Park, IL (US); Sumit Bhattacharya, Darien, IL (US); Abdellatif M. Yacout, Naperville, IL (US); Taek K. Kim, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 80 days.

(21) Appl. No.: 16/925,839

(22) Filed: Jul. 10, 2020

(65) Prior Publication Data

US 2022/0010929 A1     Jan. 13, 2022

(51) Int. Cl.
*F17C 1/10*     (2006.01)
*F17C 1/14*     (2006.01)

(52) U.S. Cl.
CPC ............... *F17C 1/10* (2013.01); *F17C 1/14* (2013.01); *F17C 2203/0604* (2013.01); *F17C 2203/0607* (2013.01); *F17C 2203/0639* (2013.01); *F17C 2203/0646* (2013.01); *F17C 2203/0648* (2013.01); *F17C 2209/225* (2013.01); *F17C 2221/011* (2013.01); *F17C 2221/012* (2013.01); *F17C 2221/017* (2013.01); *F17C 2260/053* (2013.01)

(58) Field of Classification Search
CPC ..................................... F17C 1/10; F17C 1/14
USPC .......... 220/62.15, 586, 581; 206/6; 428/34.5; 501/152, 154
See application file for complete search history.

(56) References Cited

U.S. PATENT DOCUMENTS

| | | | |
|---|---|---|---|
| 3,277,565 A | 10/1966 | Bohlander | |
| 3,770,487 A * | 11/1973 | Gibson | C04B 35/80 376/414 |
| 3,784,384 A | 1/1974 | Webb | |
| 4,071,587 A | 1/1978 | Eggers | |
| 8,652,589 B2 | 2/2014 | Ramm | |
| 9,719,353 B2 * | 8/2017 | Bolcavage | C23C 28/023 |
| 2015/0063523 A1 | 3/2015 | Yacout et al. | |
| 2020/0271272 A1* | 8/2020 | Lee | F17C 1/06 |
| 2020/0276775 A1* | 9/2020 | Ueda | B29C 53/62 |

(Continued)

FOREIGN PATENT DOCUMENTS

| | | |
|---|---|---|
| CN | 101265603 A | 9/2008 |
| CN | 101629028 A | 1/2010 |
| CN | 103557612 A | 2/2014 |

OTHER PUBLICATIONS

Anderson et al., Reactivity control of fast-spectrum reactors by reversible hydriding of yttrium zones, NASA TN D-4615 (1968).

(Continued)

*Primary Examiner* — Robert J Hicks
(74) *Attorney, Agent, or Firm* — Marshall, Gerstein & Borun LLP (57) ABSTRACT

A gas enclosure can include a refractory metal liner; a ceramic matrix composite cladding; and a diffusion barrier layer. The refractory metal liner is adapted to surround and enclose a gas to be contained within the gas enclosure. The diffusion barrier layer is disposed between the refractory metal liner and the ceramic matrix composite cladding.

20 Claims, 9 Drawing Sheets

(56) References Cited

U.S. PATENT DOCUMENTS

| | | | | |
|---|---|---|---|---|
| 2020/0347992 | A1* | 11/2020 | Volkmer | F17C 1/04 |
| 2021/0237335 | A1* | 8/2021 | Shindo | F17C 1/16 |
| 2021/0237367 | A1* | 8/2021 | Takami | F16J 12/00 |
| 2021/0293380 | A1* | 9/2021 | Fujii | F17C 1/16 |

OTHER PUBLICATIONS

Appel et al., Gamma Titanium Aluminide Alloys: Science and Technology, John Wiley & Sons (2011).

Bejaoui et al., ECRIX-H experiment: Synthesis of post-irradiation examinations and simulations, J. Nuclear Materials, 415(2):158-66 (2011).

Brimahll et al., Database on Permeation, Diffusion, and Concentration of Hydrogen Isotopes in Fusion Reactor Materials, Fusion Reactor Materials Semiannual Progress Report, DOE/ER-0313/16 (1994).

Chaffron et al., Innovative SiC/SiC Composite for Nuclear Applications, EPJ Web of Conferences (2013).

Chai et al., Ultra-thin Al2—O3 films grown by atomic layer deposition for corrosion protection of copper, RSC Advances, 4(92):50503-9 (2014).

Comeli et al., Effects of tempering temperature on the microstructure and creep resistance of X22C4MoV12-1 steel used on steam turbine blades, Am J Materials Sci., 8(4):65-72 (2018).

Dever et al., Research on high-termperature aerospace materials at NASA Glenn Research Center, J. Aerospace Engineering, 26(2):500-514 (2013).

El-Genk et al., A review of refractory metal alloys and mechanically alloyed-ixude dispersion strengthened steels for space nuclear power systems, J Nuclear Materials, 340(1):93-112 (2005).

Elen et al., Voids in vanadium, niobium and molybdenum by fast neutron irradiation at high temperatures, J. Nuclear Materials, 39(2):194-202 (1971).

Forcey et al., Formation of hydrogen permeation barriers on steels by aluminising, J. Nuclear Materials, 182:36 (1991).

Forcey et al., Hydrogen transport and solubility in 316L and 1.4914 steels for fusion reactor applications, J. Nuclaer Materials, 160:117-24 (1988).

Gibala et al., Hydrogen embrittlement and stress corrosion cracking, ASM International, 324 (1984).

Hishinuma et al., Void swelling in electron irradiated Hastelloy-X. J. Nuclear Science and Technology, 15(4): 288-295 (1978).

Hollenberg et al., Tritium/hydrogen barrier development, Fusion Engineering and Design, 28:190-208 (1995).

Honeycombe et al., Steels: Microstructure and Properties. Metallurgy and Materials Science, American Society for Metals (Jan. 1982).

Horak et al., Creep properties of Nb—1Zr and Nb—1Zr—0.1 C, No. ORNL-6809, Oak Ridge National Laboratory (1994).

Investigation of the Environment Fate of Tritium in the Atmosphere, Canadian Nuclear Safety Commission (CNSC), INFO-0792 (2009).

James et al., 700 Bar type IV H2 pressure vessel cost projections. IN: Department of Energy Physical-Based Hydrogen Storage Workshop: Identifying Potential Pathways for Lower Cost 700 Bar Storage Vessels (2016).

Johnson et al., A brief review of atomic layer deposition: from fundamentals to applications, Materials Today, 16(5):236-46 (2014).

Katoh et al., Observation and possible mechanism of irradiation induced creep in ceramics, J. Nuclear Materials, 434(1-3):141-151 (2013).

Kellner, Space Age Ceramics are Aviation's New Cup of Tea, General Electric Reports, downloaded from the Internet at: <https://www.ge.com/reports/space-age-cmcs-aviations-new-cup-of-tea/> (published Jul. 13, 2016).

Koyanagi et al., SiC/SiC Cladding Materials Properties Handbook, Technical Report ORNL/TM-2017/385, Oak Ridge National Laboratory (2017).

Leonard et al., Nb-base FS-85 alloy as a candidate structural material for space reactor applications: Effects of thermal aging, Metallurgical and Materials Transactions A, 40(4):838-55 (2009).

Lundin et al., Pressure-temperature-composition relationships of the yttrium-hydrogen system, J. Electrochemical Soc., 109(9):838-42 (1962).

Management of Tritium at Nuclear Facilities, IAEA Vienna, Technical Report Series No. 234, 1984.

Matejicek et al., Characterization of less common nitrides as potential permeation barriers, Fusion Engineering and Design, 139:74-80 (2019).

Merrigan, Heat Pipe Technology Issues, 1st Symposium on Space Nuclear Power Systems, Albuquerque, New Mexico, Jan. 11-13, 1984, Los Alamos National Laboratory LA-UR-84-1238 (1984).

Miao et al., Advanced moderation module for thermal neutron reactors operating at elevated temperatures, United States. doi:10.2172/1656612 (published Aug. 31, 2020).

Mueller et al. (eds.), Metal Hydrides, Elsevier 2013.

Muroga, Refractory metals as core materials for Generation IV nuclear reactors, In: Structural Materials for Generation IV Nuclear Reactors, pp. 415-440. Woodhead Publishing, 2017.

Olander et al., Uranium-zirconium hydride fuel properties, Nuclear Engineering and Design, 239(9):1406-24 (Aug. 2009).

Osborne et al., Reducing Irradiation Damage in a Long-Life Fast Reactor with Spectral Softening, Energies, 11(6):1507 (2018).

Perujo et al., Tritium permeation barriers for fusion technology, Fusion Engineering and Design, 28:252 (1995).

Prasad et al. (eds.), Aerospace Materials and Material Technologies, vol. 3, Singapore: Springer (2017).

Ribeiro et al., Hydrogen gas permeation through amorphous and partially crystallized Fe40Ni38Mo4B18, Mat. Res, vol. 15 No. 5 Aug. 30, 2012.

Sauder, Ceramic matrix composites: nuclear applications, Ceramic Matrix Composites: Materials, Modeling and Technology: pp. 609-646 (2014).

Senor et al., Thermophysical property correlations for the niobium-1% zirconium alloy, J. Nuclear Materials, 173(3):261-73 (1990).

Senor et al., Transport property correlations for the niobium-1% zirconium alloy, J. Nuclear Materials, 173(3):274-83 (1990).

Serra et al., Hydrogen permeation measurements on alumina, J. Am. Ceramic Soc., 88:15 (2005).

Shivprasad et al., High temperature moderator material for microreactors, No. LA-UR-20-21710, Los Alamos National Lab, United States (Feb. 25, 2020).

Simnad, The U-ZrHx alloy: its properties and use in TRIGA fuel, Nuclear Engineering and Design, 64(3):403-22 (1981).

Singh et al., Interlaboratory round robin study on axial tensile properties of SiC—SiC CMC tubular test specimens, Int. J. Applied Ceramic Technology, 15(6):1334-49 (2018).

Snead et al., Handbook of SiC properties for fuel performance modeling (thermal conductibility), J. Nuclear Materials, 371:329-77 (2007).

Snyder, Aircraft Nuclear Propulsion: An Annotated Bibliography, prepared for the United States Air Force History and Museums Program, May 3, 1996.

Song, Hydrogen permeation resistance of plasma-sprayed Al2O3 and Al2O3—13wt.% TiO2 ceramic coatings on austenitic stainless steel, Surface and Coatings Technology, 168:191 (2003).

Stone et al., Stress analysis and probabilistic assessment of multilayer SiC-based accident tolerant nuclear fuel cladding, J. Nuclear Materials, 466:682-97 (2015).

Summary Report of HTRE No. 3 Nuclear Excursion, United States: N. p., 1965. Web. doi:10.2172/4643464.

Suzuoka, Lattice and Grain Boundary Diffusion in polycrystals, Transactions of the Japan Institute of Metals, 1961 vol. 2 Issue 1 pp. 25-32.

Tamura, Hydrogen Permeation Characteristics of TiN-Coated Stainless Steels, Journal of Materials Science and Engineering A, 5 (5-6) (2015) 204-208.

U.S. Appl. No. 16/925,782 "Hydrogren Permeation Barrier Coatings and Methods of Making the Same", filed Jul. 10, 2020.

Vetrano, Hydrides as neutron moderator and reflector materials, Nuclear Engineering and Design, 14(3):390-412 (1971).

(56) References Cited

OTHER PUBLICATIONS

Ward et al., Technical challenges and future direction for high-efficiency metal hydride thermal energy storage systems, Appl. Physics A, 122(4):462 (2016).
Yokoyama et al. Proceedings of the International Conference on Nuclear Engineering (ICONE-9), pp. 8-12 (2001).
Yvon (ed.), Structural Materials for Generation IV Nuclear Reactors, Woodhead Publishing (2016).
Zhu, Aerospace ceramic materials: thermal, environmental barrier coatings and SiC/SiC ceramic matrix composites for turbine engine applications, NASA/TM-2018-219884 (2018).

* cited by examiner

HIGH-TEMPERATURE AND/OR HIGH PRESSURE GAS ENCLOSURE

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

BACKGROUND

Field of the Disclosure

The disclosure relates to gas enclosures and more particularly to gas enclosures with high heat and/or high-pressure resistance.

Brief Description of Related Technology

Pressure vessel or pipeline systems are widely used in a variety of areas, such as energy production/energy storage systems and in the chemical industry. In these systems, high temperature is frequently needed as it helps enhance the efficiency of energy production and storage as well as activate the kinetics of chemical reactions. However, the mechanical properties of materials usually degrade with temperature increases due under a variety of mechanisms, including creep and surface corrosion that is activated at high-temperature. Thus, as the temperature requirements increase, the selection of suitable materials for making such systems becomes more and more limited. To effectively and reliably contain high-temperature and/or high-pressure gas, materials with sufficiently high-temperature mechanical strength and corrosion resistance need to be used to form a pressure boundary that has enough wall thickness to enclose the gas without failure or leaking. For example, nickel-based super alloys and refractory metal alloys are conventionally used for high-temperature gas enclosure applications. With enough wall thickness, these conventional heat-resistant metallic materials are capable of containing the high pressure gasses at elevated temperature.

However, the use of thick-wall heat-resisting metals suffer from various drawbacks that limit their applications. Existing high-temperature alloys are typically Ni-based or refractory metal-based. The resulting thickness needed to contain high pressure gasses using these conventional materials results in structures having significant weight. This limits their use, particularly where portability is needed. Further, one of the major applications of high-temperature pressurized vessels and pipelines is advanced nuclear reactors, such as very-high-temperature-reactors (VHTRs). In particular, the coolant sleeve technology for VHTR application contains high-gas pressure inside coolant channels that go through the nuclear core to remove heat, and keeps the core at low pressure allowing for a thinner reactor vessel. The enclosure also provides an additional containment barrier between fuel and coolant, which prevents contamination of coolant. Both Ni and refractory metals have high neutron capturing cross-sections, making these materials unfavorable in nuclear reactors, especially in the core region. Such materials can compromise neutronics and result in the need for higher required fuel enrichment, shorter fuel lifetime or larger core volume, which reduces the economic attractiveness of an advanced reactor.

Conventional materials are also particularly unsuitable for micro-reactors. Micro-reactors have inherent safety, competitive efficiency and adequate mobility to be deployed in remote areas. As the efficiency of the heat engine is positively dependent on the temperature of its hot source, high-efficiency micro-reactors require high operating temperatures. Neutronics and mobility concerns make it impractical to use conventional gas enclosure materials for micro-reactors.

SUMMARY

There is a need for innovative material solutions for high-temperature and high-pressure gas enclosures that deliver reliable enclosure performance with low specific weight for high portability. For nuclear application, in particular, material solution can help reduce neutronic penalties. Additionally, as corrosion is a diffusion-driven process that is accelerated at elevated temperature, there is a need for a material solution that can provide corrosion resistance under operating conditions.

In accordance with embodiments, a gas enclosure can include a refractory metal liner adapted to surround and enclose a gas to be contained; a ceramic matrix composite cladding; and a diffusion barrier layer disposed between the refractory metal liner and the ceramic matrix composite cladding.

DETAILED DESCRIPTION

Figure 1:
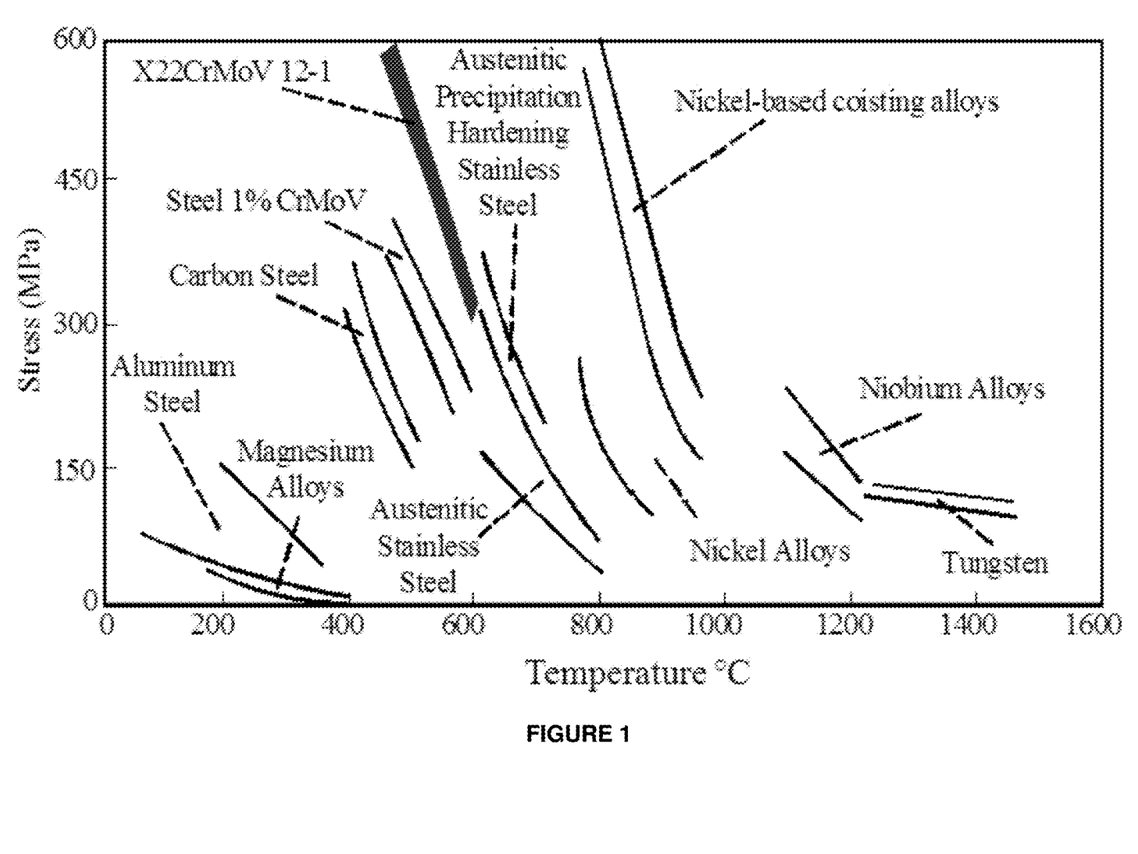
FIG. 1 is a graph showing mechanical strength of various materials at elevated temperatures.
Figure 2:
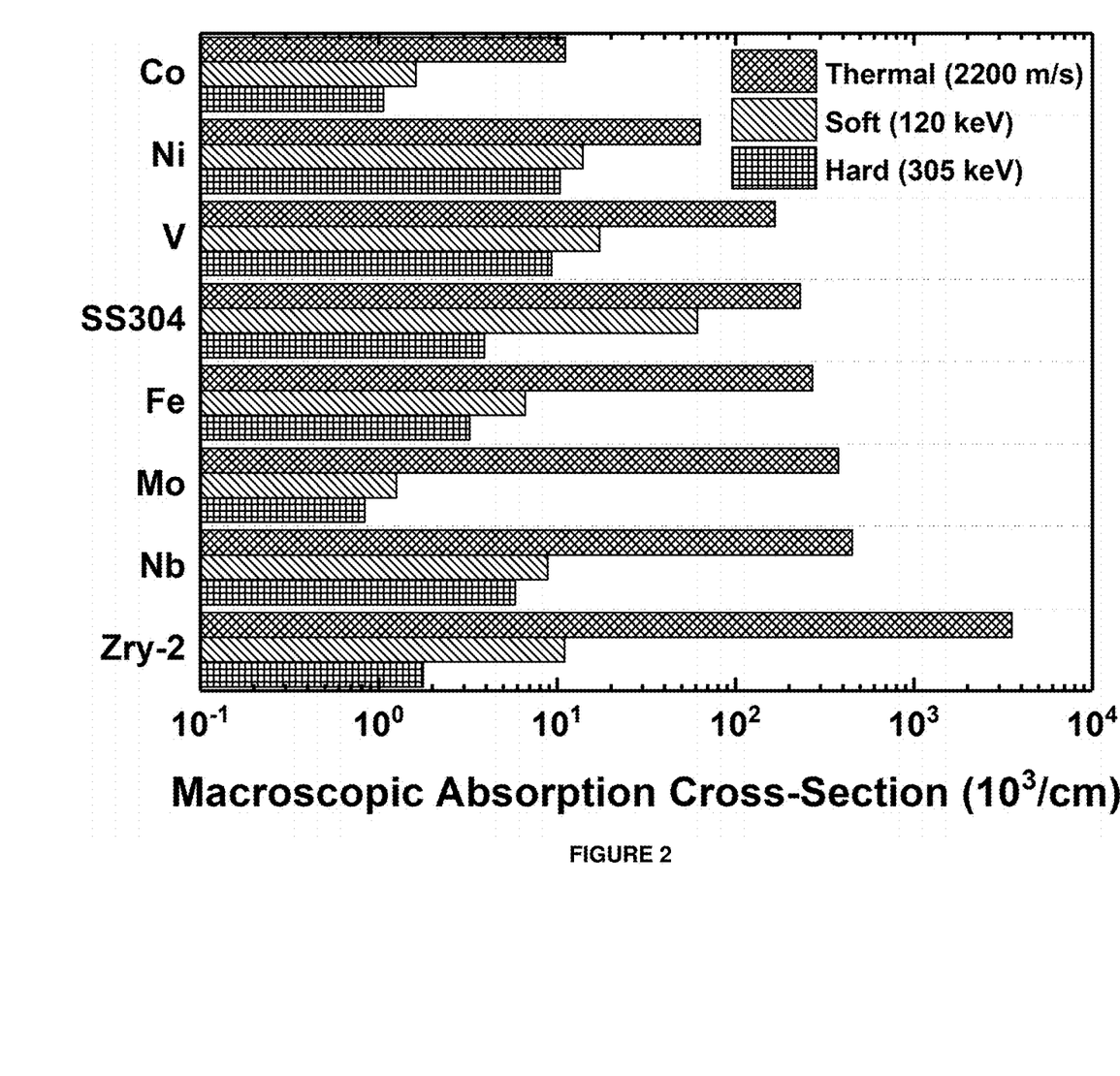
FIG. 2 is a graph showing neutron capturing cross section for conventional materials.

Referring to FIG. 1, beyond operating temperatures of approximately 700° C., conventional structural materials are limited to Ni-based super alloys (e.g., Inconel) and refractory metal based alloys (e.g., Nb-1Zr, TZM, W—Re—Ta alloys, and the like) because these materials provide sufficient mechanical strength at elevated temperatures. However, these metal-based materials all have relatively high density (Inconel is about 8.2 g/cc; Nb-1Zr is about 8.6 g/cc; TZM is about 10.22 g/cc; and W is about 19.35 g/cc). Further, as shown in FIG. 2, the neutron capturing cross sections of these materials are also significant.

Figure 3:
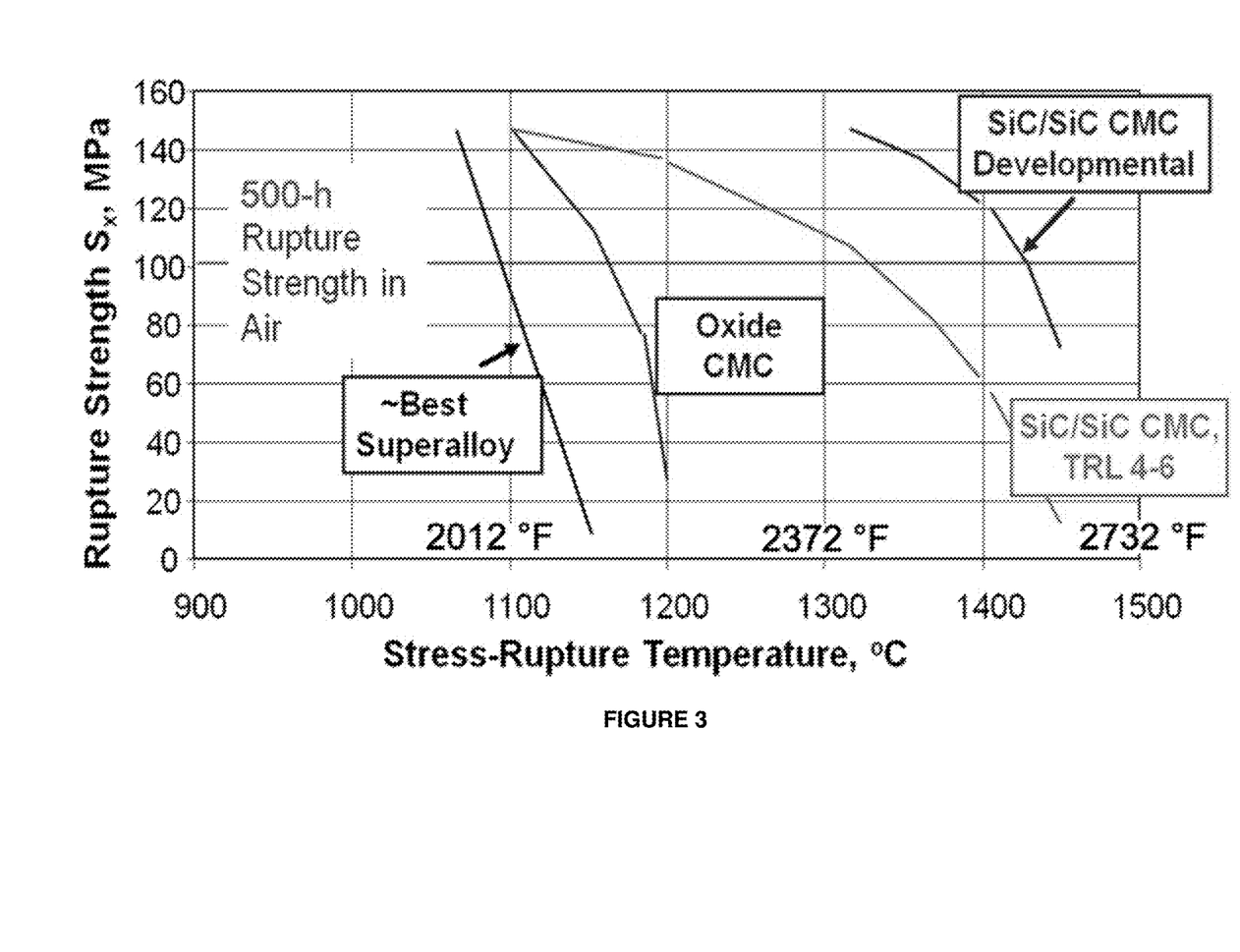
FIG. 3 is a graph showing the 500-hour creep rupture strength comparison between super alloys and CMC.

Ceramics, while being able to provide better or similar high-temperature mechanical strength compared to refractory metals, tend to crack under low tensile stress, making them inappropriate for pressurized vessel or pipeline applications. Referring to FIG. 3, composite materials, such as ceramic matrix composite (CMC) materials can survive tensile stress up to about 200 MPa, but are subjected to microcrack formation at very low tensile stress (well below its ultimate tensile stress at ~200 MPa and its proportional limit stress at ~80 MPa).

At low temperature, carbon fiber reinforced polymer has been used to contain fuel gases such as hydrogen and methane with a polymer or metal (steel or aluminum) liner to prevent leaking. These materials, however, cannot be used at high temperature due to the decomposition of the polymer and enhanced diffusion/corrosion at high temperatures.

It has advantageously been found that the gas enclosure materials of the disclosure provide lightweight and low-neutronic-penalty solution for gas enclosures operating at high temperatures. The term "gas enclosure" is used generally used herein to reference a variety of types of enclosure systems, such as pressurized vessels, channels, chambers, and pipelines. In embodiments, the gas enclosures of the disclosure can be used in micro-reactors.

The gas enclosures of the disclosure can be used in high-temperature applications, as well as high-temperature and high pressure applications. A variety of gasses including inert gases and reactive gases can be contained. Noble gases include, but are not limited to He, Ne, Ar, Kr, Xe, and the like. Reactive gases include, but are not limited to $CO_2$, $H_2$, $O_2$, and the like.

Gas enclosures of the disclosure can be used in various applications and can be provided in various forms. For example, the enclosures can be provided as tubes, vessels, chambers, and channels. Gas enclosures in accordance with the disclosure can be used, for example, in gas storage, gas-phase chemical reactors, pipelines and chambers, such as in nuclear reactors, jets, and rocket engines, heat exchangers, coolant channels, and other applications in which gas storage and/or transfer is needed, and particularly in high-temperature-high-pressure environments. Gas enclosure in accordance with the disclosure can be particularly useful in providing a lightweight, high strength enclosure that can operate at high temperatures and high pressures, while maintaining a low neutron penalty. This can be particularly useful in micro-reactors and engine components, where weight can be a limiting factor, and neutron penalty can significantly limit conventional gas enclosure systems.

Figure 4:
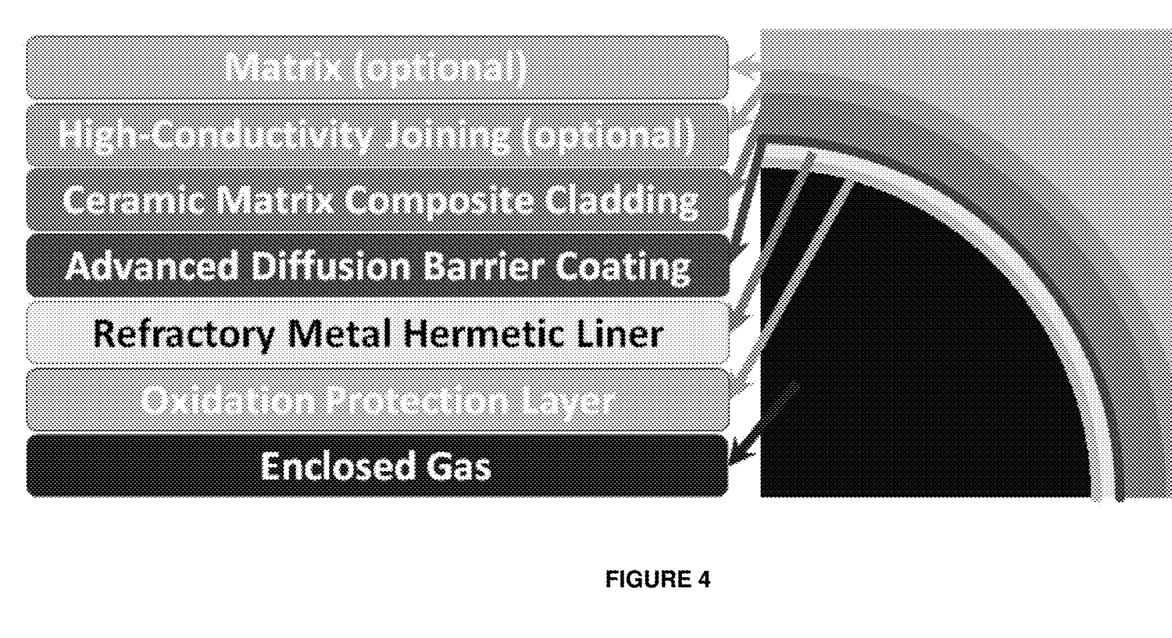
FIG. 4 is a schematic illustration of a gas enclosure in accordance with the disclosure.

Referring to FIG. 4, in embodiments, a gas enclosure can include a refractory metal liner, a ceramic matrix composite cladding and a diffusion barrier layer disposed between the refractory metal liner and the ceramic matrix composite cladding. It has been found that inclusion of the diffusion barrier layer between the refractory metal liner and the ceramic matrix composite cladding can prevent reaction between the refractory metal liner and the ceramic matrix composite cladding that can occur at high operating temperatures. The refractory metal liner protects the ceramic matrix composite cladding against microcrack formation, thereby allowing the composite ceramic matrix materials to be used in high-pressure systems for which they were conventional considered to be unsuited. Embodiments of the disclosure can operate at temperatures of up to about 1400° C. For example, embodiments of the disclosure can operate at temperatures of greater than about 700° C., greater than about 800° C., greater than about 900° C., greater than about 1000° C., greater than about 1100° C., greater than about 1200° C., greater than about 1300° C. and up to about 1400° C. Embodiments of the disclosure can operate at pressures in excess of about 0.1 MPa and up to about 25 MPa, depending on the wall-thickness of the enclosure, the outer diameter, and the operating temperature. Significantly, it has been found that the enclosures of the disclosure can operate at pressures greater than those of a conventional enclosure given the same wall-thickness, outer diameter, and operating temperature. For example, for an enclosure having a 10 mm outer diameter and 1 mm ceramic matrix composite cladding, with a 0.1 mm metal liner, operating at temperature of 1000° C., the maximum gas pressure can be about 25 MPa. Variations in the outer diameter, wall thickness, and operating temperature can result in increases and decreases of the maximum operating pressure. For example, embodiments of the disclosure can operate in pressures of about 0.1 MPa to about 10 MPa, about 5 MPa to about 20 MPa, about 15 MPa to about 25 MPa, about 1 MPa to about 8 MPa. Other suitable pressures include about 0.1, 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, and 25 MPa.

Further, the increased strength provided by the ceramic matrix composite cladding can allow for reduction in the thickness of the refractory metal liner without sacrificing performance. The enclosures of the disclosure thus can have significantly reduced weight as compared to conventional enclosures, making them particularly advantageous for applications in which portability is desirable. In embodiments, the enclosures of the disclosure can have a linear specific mass that is half that of the same size conventional refractory metal enclosure. The degree of the reduction can be dependent on the enclosure design.

Embodiments of the disclosure can also increase core lifetime as compared to conventional gas enclosure materials, as the materials used in the enclosures of the disclosure have low neutron penalty.

For example, a 13 mm inner diameter tube for high-pressure-high-temperature application would conventionally require Ni or Nb tubes with 750 μm wall thickness based on conventional systems. This results in an enclosure having a linear specific mass of 2.866 g/cm for Ni and 2.776 g/cm for Nb. By comparison, an enclosure in accordance with embodiments of the disclosure can perform to contain the same or greater pressure while utilizing a 200 μm Nb liner, 500 μm thick $SiC_f$/SiC tube, which has a linear specific mass of 1.322 g/cm. This is a reduction of linear specific mass by half.

In embodiments, the refractory metal liner can have a thickness of about 100 μm to about 500 μm, about 100 μm to about 200 μm, and about 150 μm to about 350 μm. Other suitable thicknesses can include, for example, about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, and 500 μm. Again the thickness of the refractory metal liner can depend on the design and the operating temperature, but, significantly, an enclosure in accordance with the disclosure can have a significantly reduced thickness of the refractory metal liner layer as compared to a conventional enclosure having a refractory metal tube for withstanding the same pressure at the same operating temperature. For example, for an 11 mm outer diameter tube, an enclosure in accordance with the disclosure can operate to a pressure of up to 8.1 MPa at 1000° C. with a 0.4 mm thick ceramic composite matrix and 0.1 mm refractory metal liner (For example Nb-1Zr liner). By comparison, a conventional enclosure having a Nb-1Zr tube of the same outer diameter, would need to be 2.4 mm thick to operate to a pressure of up to 8.1 MPa at 1000° C., while a Nb-1Zr-0.1C (PWC-11) tube would need to be 0.92 mm thick to achieve the same pressure capability at the same operating conditions.

Any refractory metal can be used. For example, the refractory metal can be or include one or more of Ti, Nb, Mo, Ta, W, Re, laminates thereof, and alloys thereof The ceramic matrix composite cladding can be or can include a reinforcement phase (A) and a matrix phase (B). In embodiments, the reinforcement phase can include ceramic reinforcement and the matrix phase can include a ceramic matrix, wherein the notation is as follows: type of reinforcement/type of matrix (e.g., CJ/SiC is carbon fiber reinforced silicon carbide). The reinforcement phase can be, for example, fibers, particles, meshes, and other such structures as is known in the art. In embodiments, the ceramic matrix composite cladding can include ceramic fibers embedded in the ceramic matrix. In embodiments, the ceramic matrix composite cladding includes one or more of SiC, C, $Al_2O_3$, $Al_2O_3$—$SiO_2$, $Si_3N_4$, SiC/SiC, C/SiC, C/C, SiC/C, $Al_2O_3/Al_2O_3$. In embodiments, the ceramic composite matrix cladding includes SiC/SiC. In embodiments, the reinforcement phase can include one or more of SiC, C, $Al_2O_3$, $Al_2O_3$—$SiO_2$, $Si_3N_4$. In embodiments, the matrix phase can include one or more of SiC, C, $Al_2O_3$, $Al_2O_3$—$SiO_2$, $Si_3N_4$. Any combinations of reinforcement phase and matrix phase components can be used. In embodiments, the reinforcement phase can further include an interface coating comprising C, PyC, BN, SiC, $Al_2O_3$, $SiO_2$, $ZrO_2$, AlN, $LaPO_4$, $ErTaO_4$, $MeWO_4$, $MeMoO_4$, $ReTaO_4$, $Re_3NbO_4$, $MgWo_4$, $CaWo_4$, and the like. The interface coating can be any suitable coating known to one of ordinary skill in the art to prevent fusion of the matrix and the reinforcement phases.

The ceramic matrix composite cladding can have a thickness of about 100 μm to 2000 μm, about 100 μm to about 500 μm, about 200 μm to about 750 μm, about 400 μm to about 900 μm, or about 100 μm to about 300 μm. Other suitable thicknesses include about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1100, 1200, 1300, 1400, 1500, 1600, 1700, 1800, 1900, and 2000 μm.

As used herein, the ceramic matrix composite layer can be fabricated using any suitable fabrication method known to one of ordinary skill in the art. For example, the ceramic matrix composite layer can be fabricated using a polymer infiltration and pyrolysis (PIP) method, a chemical vapor infiltration method, a liquid phase infiltration method, a hot press sintering method, or the like. In embodiments, the ceramic matrix composite layer can be fabricated by polymer infiltration and pyrolysis (PIP) or chemical vapor infiltration.

The diffusion barrier layer can be one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, ($ZrO_2.SiO_2$), ($ZrO_2.xY_2O_3$). The diffusion barrier layer material is selected to prevent interaction or reaction between the ceramic matrix composite cladding material and the refractory metal when the enclosure is subjected to high temperatures. In nuclear applications, the diffusion barrier is particularly useful, as diffusion is enhanced by radiation.

The diffusion barrier layer can have a thickness of about 100 nm to about 20 μm, about 500 nm to about 10 μm, about 100 nm to about 800 nm, about 1 μm to about 5 μm, about 8 μm to about 16 μm, and about 750 nm to about 7 μm. Other suitable values include about 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, and 20 μm.

The diffusion barrier layer can be coated on one or both of the refractory metal liner and the ceramic matrix composite cladding, so long the diffusion barrier layer is disposed between and isolates the refractory metal liner from interaction with the ceramic matrix composite cladding. Any suitable coating methods can be used for forming the diffusion barrier layer, including, for example, atomic layer deposition (ALD), physical vapor deposition (PVD), chemical vapor deposition (CVD), surface reaction coating, electroplating, and cold/hot spraying. In embodiments, the diffusion barrier layer can be an ALD formed layer, which can advantageously provide a pinhole free layer all or substantially all of the surface are of the refractory metal liner and/or ceramic matrix composite cladding.

In embodiments, the diffusion barrier layer can include multiple layers. In embodiments, the multiple layers include alternating ceramics layers and metal layers. In embodiments, the ceramics layers include one or more of an oxide, a nitride, a carbide, an aluminide, a silicide, an elemental ceramic, a complex oxide, and combinations thereof. In embodiments, the ceramics layers can include one or more of $Al_2O_3$, $Y_2O_3$, $ZrO_2$, $TiO_2$, $SiO_2$, $Cr_2O_3$, ZrN, TiN, AlN, ZrC, TiC, SiC, NbC, FeAl, $FeAl_2$, $Fe_2Al_5$, $ZrAl_3$, $MoSi_2$, $NbSi_2$, Si, ($ZrO_2.SiO_2$), ($ZrO_2.xY_2O_3$) and combinations thereof. In embodiments, the ceramics layers include one or more of $Al_2O_3$, $ZrO_2$, ZrN, and combinations thereof. In embodiments, the ceramics layers include $Al_2O_3$. For nuclear application, it can be advantageous to avoid the use of an oxide in the ceramic layer, due to radiation enhanced diffusion resulting from such applications. In non-nuclear applications, however, the diffusion barrier layers with oxide-based ceramics can be utilized. In embodiments, the metal layers include one or more of refractory metals, high-temperature metals, high-temperature metal alloys, intermetallic compounds, and combinations thereof. In embodiments, the metal layers can include one or more of Mo, W, Nb, Ta, Ni, Co, Fe, Ru, Pd, alloys thereof, and combinations thereof.

Each metal layer and each ceramics layer, independently, can have a thickness on the nanoscale. In embodiments, each metal layer and each ceramics layer, independently, can have a thickness about 5 nm to about 1000 nm. In embodiments, each metal layer and each ceramic layer, independently, can have a thickness of about 5 nm to about 100 nm or about 5 nm to about 50 nm. In embodiments, each metal layer can have a thickness of about 25 nm to about 75 nm and each ceramics layer can have a thickness of about 5 nm to about 25 nm. For example, each metal layer can have a thickness of about 50 nm and each ceramics layer can have a thickness of about 15 nm.

In embodiments, the diffusion barrier layer can have about 4 to 50 metal layers and ceramics layers total. For example, the diffusion barrier layer can have about 4 to 45, or 4 to 40, or 4 to 30, or 4 to 20, or 10 to 50, or 10 to 40, or 10 to 30, or 20 to 40, metal layers and ceramics layers combined. In embodiments, the diffusion barrier layers can have about 12 to about 18 metal layers, and about 12 to 18 ceramics layers. A nanoscale multilayer structure of the diffusion barrier layer can enhance thermal cycling resistance of this layer.

In embodiments, the diffusion barrier layer can have a defined microstructure. In embodiments, the microstructure can be crystalline with nano- or ultra-sized grains. In embodiments, the grains can be equiaxed. In embodiments, the diffusion barrier layer has both (i) an ultra- and/or nano-crystalline structure and (ii) equiaxed grains. Nano-size grains generally have a grain size of about 0.1 nm to about 100 nm, and ultra-sized grains generally have a grain size of about 100 nm to about 500 nm.

In embodiments in which the diffusion barrier layer is a multi-layer structure, one or more of the individual layers can have a microstructure as described above, while other layers have different microstructures. For example, a diffusion barrier multi-layer structure having a ceramic layer and a metal layer can have an amorphous ceramic layer and a metal layer with an ultra and/or nano-crystalline structure with or without equiaxed grains. Various combinations of microstructures in a multi-layer structure can be used. For example, a multi-layer structure can include one or more of the following microstructures in the individual layers, an amorphous microstructure, a nanocrystalline microstructure with equiaxed grains, an ultracrystalline microstructure with equiaxed grains, a microstructure having larger than ultra-sized grains, but with equiaxed grains, a nanocrystalline microstructure without equiaxed grains, and an ultracrystalline microstructure without equiaxed grains. In embodiments, the entire diffusion barrier layer can have a microstructure that is nano- and/or ultra-crystalline with equiaxed grains.

Additional examples of diffusion barrier layers can be found, for example, in U.S. Patent Application Publication No. 2015/0063523, the disclosure of which is incorporated herein by reference.

The ceramic matrix composite layer can be fabricated using any suitable fabrication method known to one of ordinary skill in the art. For example, the ceramic matrix composite layer can be fabricated using a polymer infiltration and pyrolysis (PIP) method, a chemical vapor infiltration method, a liquid phase infiltration method, a hot press sintering method, or the like. In embodiments, the ceramic matrix composite layer can be fabricated by polymer infiltration and pyrolysis (PIP) or chemical vapor infiltration.

The enclosure can further include a corrosion protection layer disposed on the inner surface of the refractory metal liner, and arranged such that the corrosion protection layer is disposed between the gas and the refractory metal liner. The corrosive protection layer can be used for example as a protective layer against a corrosive gas and for oxygen and moisture exposure when enclosing inert gasses. Any suitable coating methods can be used for forming the corrosion protection layer, including, for example, atomic layer deposition (ALD), chemical vapor deposition (CVD), surface reaction coating, and electroplating.

The corrosion protection layer can include one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, $(ZrO_2.SiO_2)$, $(ZrO_2.xY_2O_3)$. Further, the corrosion protection layer can include alternating ceramic and metal layers as described above for the diffusion barrier layer. In embodiments, a diffusion barrier layer material can be coated on an internal (gas facing) surface of the refractory metal liner to serve as a corrosion protection layer. Any of the foregoing diffusion barrier layer materials can be used for corrosion protection.

The corrosion protection layer can have a thickness of about 100 nm to about 20 μm, about 500 nm to about 10 μm, about 100 nm to about 800 nm, about 1 μm to about 5 μm, about 8 μm to about 16 μm, and about 750 nm to about 7 μm. Other suitable values include about 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, and 20 μm.

Embodiments of the disclosure can further include additional layers. For example, a high-conductivity joining layer can be provided on an external surface of the ceramic matrix composite cladding. This layer can aid in applications in which the ceramic matrix composite cladding is joined to other structures, for example, for joining to a matrix such as graphene. For example, the gas enclosure can be used in a very high temperature reactor and the high-conductivity joining layer can aid in joining the ceramic matrix composite cladding to the graphene matric of the reactor.

The high-conductivity joining layer can include one or more of a solid or a liquid phase. Solid joining layers can be prepared, for example, by reaction bonding or brazing. For example Si or $SiC_x$ material can be used for reaction bonding, and high temperature brazing materials can include one or more of gold, nickel, cobalt, combinations thereof and alloys thereof. Liquid phase bonding materials can include, for example, lead, lead-bismuth, or tin.

EXAMPLES

Example 1

The structural and thermal cycling performance of a multilayer diffusion barrier layer and a single layer diffusion barrier layer was compared to demonstrate the improve thermal cycling performance of the multilayer diffusion barrier structures of the disclosure. In some application in which good thermal cycling performance is needed, such multilayer structures can be advantageous. In other applications where there is no or limited thermal cycling, single layer structures, as tested herein can be used in the enclosures of the disclosure.

Both the single layer test sample and the multi-layer test sample were coated on a niobium substrate. The multilayer coating was alternating ceramic ($Al_2O_3$) and refractory metal (W) nanolayers. The single layer coating was a coating of $Al_2O_3$ directly on the niobium substrate. Both coatings were prepared by atomic layer deposition. It was found that the multilayered coating enhanced thermal cycling resistance for a diffusion barrier layer on a refractory metal liner.

Figure 5:
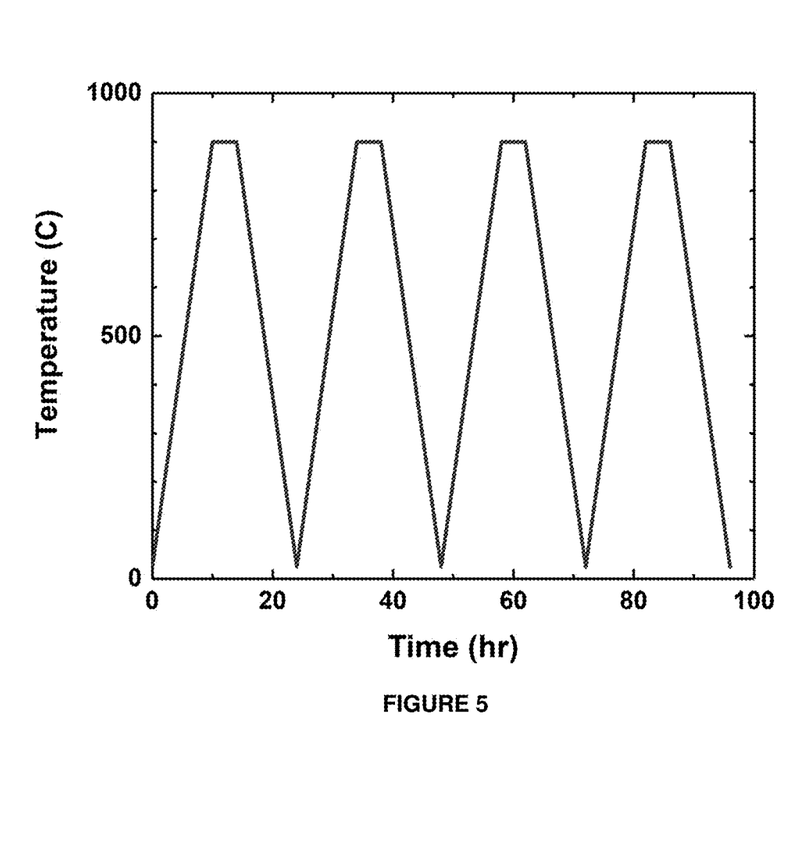
FIG. 5 is a graph showing the thermal cycling conditions used in the example.
Figure 6:
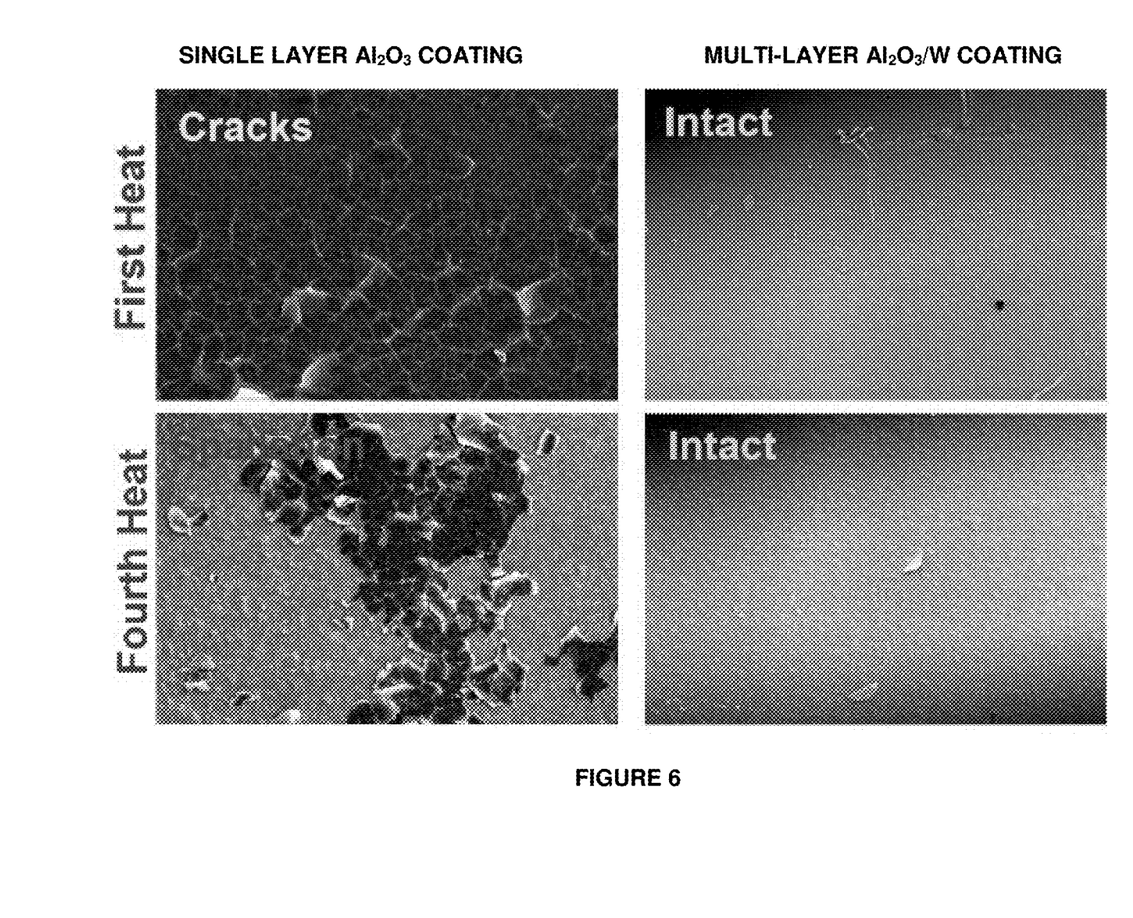
FIG. 6 is a collection of scanning electron microscope images of surfaces comparing thermal cycling resistance of a single layer coating and a multi-layer coating.
Figure 7:
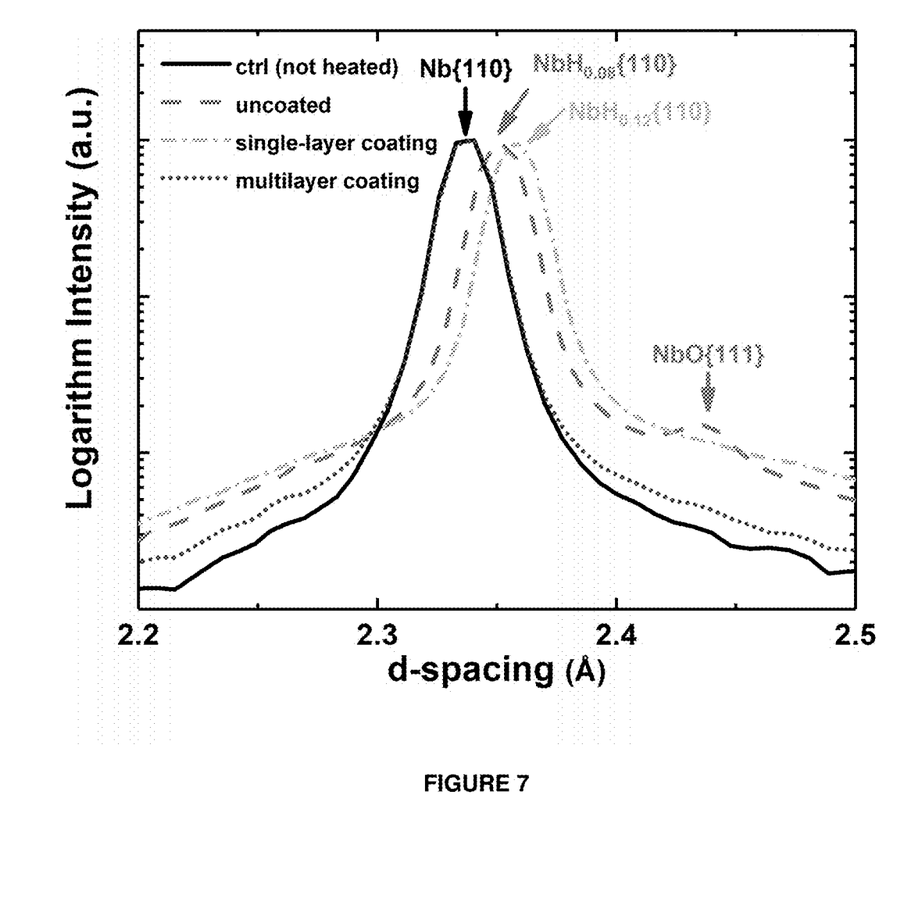
FIG. 7 is a graph showing phase identification of Niobium after thermal cycling, comparing the performance of a coating system in accordance with the disclosure with uncoated samples and conventional coating.

The samples were subjected to thermal cycling from room temperature to 950° C., as shown in FIG. 5. Thermal cycling was performed in a tube furnace with 5% H+95%/Ar atmosphere and $O_2/H_2O$ impurity. Before and after the four thermal cycles, the coating integrity was analyzed using scanning electron microscopy (SEM). As shown in FIG. 6, the samples having a multi-layer structure in accordance with the disclosure survived thermal cycling without any distinguishable changes in surface characteristics. By comparison, a single layer $Al_2O_3$ coating suffered from cracking or spallation after the first thermal cycling and continued to degrade by the fourth cycle. Synchrotron X-ray diffraction was used to further characterize the microstructure/microchemical changes in the Nb substrate. The Nb substrate with the multi-layer coating of the disclosure was found to be unchanged after thermal cycling and showed excellent corrosion resistance at high temperature. By comparison, the uncoated and single-layer coatings allowed the Nb to reach with the hydrogen and/or oxygen/moisture in the atmosphere during thermal cycling, resulting in changes in the niobium structure, as shown in FIG. 7. As shown in FIG. 7, the X-ray diffraction peak of Nb {110} of the conventionally coated and uncoated thermally cycled samples shifted, indicating changes in the Nb structure and reaction of the Nb with the atmosphere components during thermal cycling. By comparison, the multi-layer samples in accordance with the disclosure maintained the same Nb {110} peak as the Nb prior to thermal cycling, demonstrating the significantly improved stability imparted by the gas enclosure structures of the disclosure.

Example 2

An FEM simulation was generated to compare the performance of a conventional gas enclosure to an enclosure in accordance with the disclosure. For purposes of the simulation, each enclosure had an outer diameter of 11 mm and a total wall thickness of 0.5 mm. Simulations were run under an operating condition of 1000° C. For the conventional enclosures, the simulation used a tube formed of a refractory metal alloy (Nb-1Zr) or a variant Nb-1Zr-0.1C (PWC-11). PWC-11 has better creep performance due to the presence of the carbides. For the enclosure in accordance with the disclosure, the simulation used a tube having a 0.5 mm thick $SiC_f$/SiC layer coated on an inner 0.1 mm thick Nb-1Zr refractory metal liner. The simulation did not include a corrosion barrier layer or diffusion barrier layer as the thickness of these layers are too thin to contribute to mechanical performance of the enclosures.

The simulation was programed with material properties of the $SiC_f$/SiC layer obtained from literature. Koyanagi, Y. Katoh, G. Singh, and M. Snead. SiC/SiC cladding materials properties handbook. Technical Report ORNL/TM-2017/385, Oak Ridge National Laboratory, 2017; G. Stone, R. Schleicher, C. P. Deck, G. M. Jacobsen, H. E. Khalifa, and C. A. Back. Stress analysis and probabilistic assessment of multi-layer SiC-based accident tolerant nuclear fuel cladding. Journal of Nuclear Materials, 466:682-697, 2015 (density, thermal expansion coefficient, proportional limit strength, anisotropic elastic modulus, and Poisson ratio); L. L. Snead, T. Nozawa, Y. Katoh, T.-S. Byun, S. Kondo, and D. A. Petti. Handbook of SiC properties for fuel performance modeling (thermal conductibility); Journal of Nuclear Materials, 371:329-377, 2007 (specific heat); Zhu, Dongming. "Aerospace ceramic materials: thermal, environmental barrier coatings and SiC/SiC ceramic matrix composites for turbine engine applications." NASA/TM-2018-219884 (2018) (Larson-Miller creep parameter).

The simulation was programed with material properties of the Nb-1Zr alloy obtained from literature. Senor, David J., J. Kelly Thomas, and K. L. Peddicord. "Transport property correlations for the niobium-1% zirconium alloy." *Journal of nuclear materials* 173, no. 3 (1990): 274-283 (thermal conductivity); Prasad, N. Eswara, and Russel J H Wanhill, eds. *Aerospace materials and material technologies*. Vol. 3. Singapore: Springer, 2017 (Young's modulus); Senor, David J., J. Kelly Thomas, and K. L. Peddicord. "Thermophysical property correlations for the niobium-1% zirconium alloy." *Journal of nuclear materials* 173, no. 3 (1990): 261-273 (specific heat, thermal expansion coefficient, and density); Leonard, Keith J., Jeremy T. Busby, David T. Hoelzer, and Steven J. Zinkle. "Nb-base FS-85 alloy as a candidate structural material for space reactor applications: effects of thermal aging." *Metallurgical and Materials Transactions A* 40, no. 4 (2009): 838-855 (Larson-Miller creep parameter). Properties for the PWC-11 material was obtained from Horak, J. A., and L. K. Egner. *Creep properties of Nb-1Zr and Nb-1Zr-0.1 C*. No. ORNL-6809. Oak Ridge National Lab., 1994. Nb-1Zr is coded by ASTM for both nuclear and non-nuclear grades, while PWC-11 is not. ASTM B394-18, Standard Specification for Niobium and Niobium Alloy Seamless and Welded Tubes.

For a 10-year lifetime (87,660 hrs) at 1000° C., $SiC_f$/SiC stress limit is beyond 200 MPa, which exceeds the proportional limit strength of $SiC_f$/SiC (100 MPa). So, 100 MPa was used as the upper limit of allowed stress in $SiC_f$/SiC simulation. For conventional enclosure, based on the same lifetime and temperature, the stress limit is 15 MPa (1% creep strain) for Nb-1Zr and 47.3 MPa for PWC-11.

Using Comsol FEM code, it was determined that the maximum internal gas pressure of the simulated conventional enclosures was 1.38 MPa (Nb-1Zr) and 4.2 MPa (PWC-11), and that the maximum internal gas pressure of the simulated enclosure in accordance with the disclosure was 8.1 MPa. Also, the linear mass of the simulated conventional enclosures was 1.425 g/cm, whereas the linear mass of the simulated enclosure of the disclosure was 0.634 g/cm.

Figure 8A:
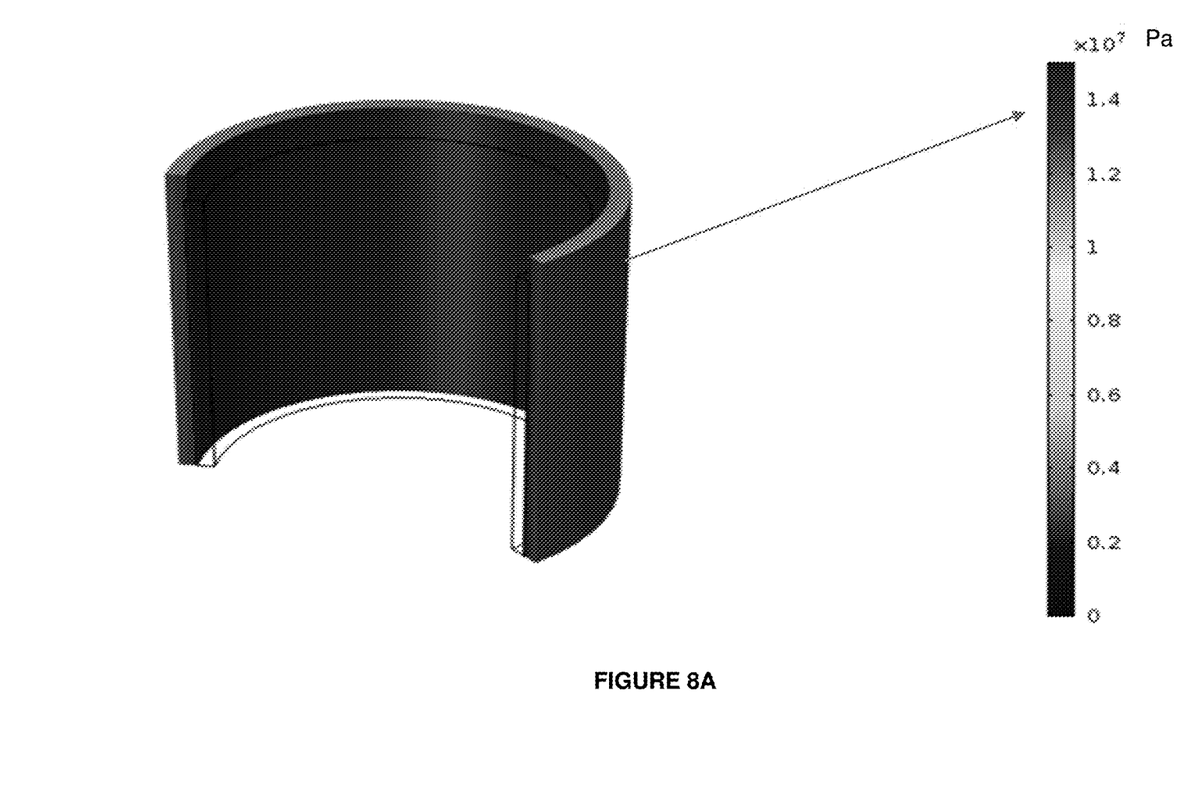
FIG. 8A is an image illustrating the von Mises stress calculated in an FEM simulation for a conventional gas enclosure.
Figure 8B:
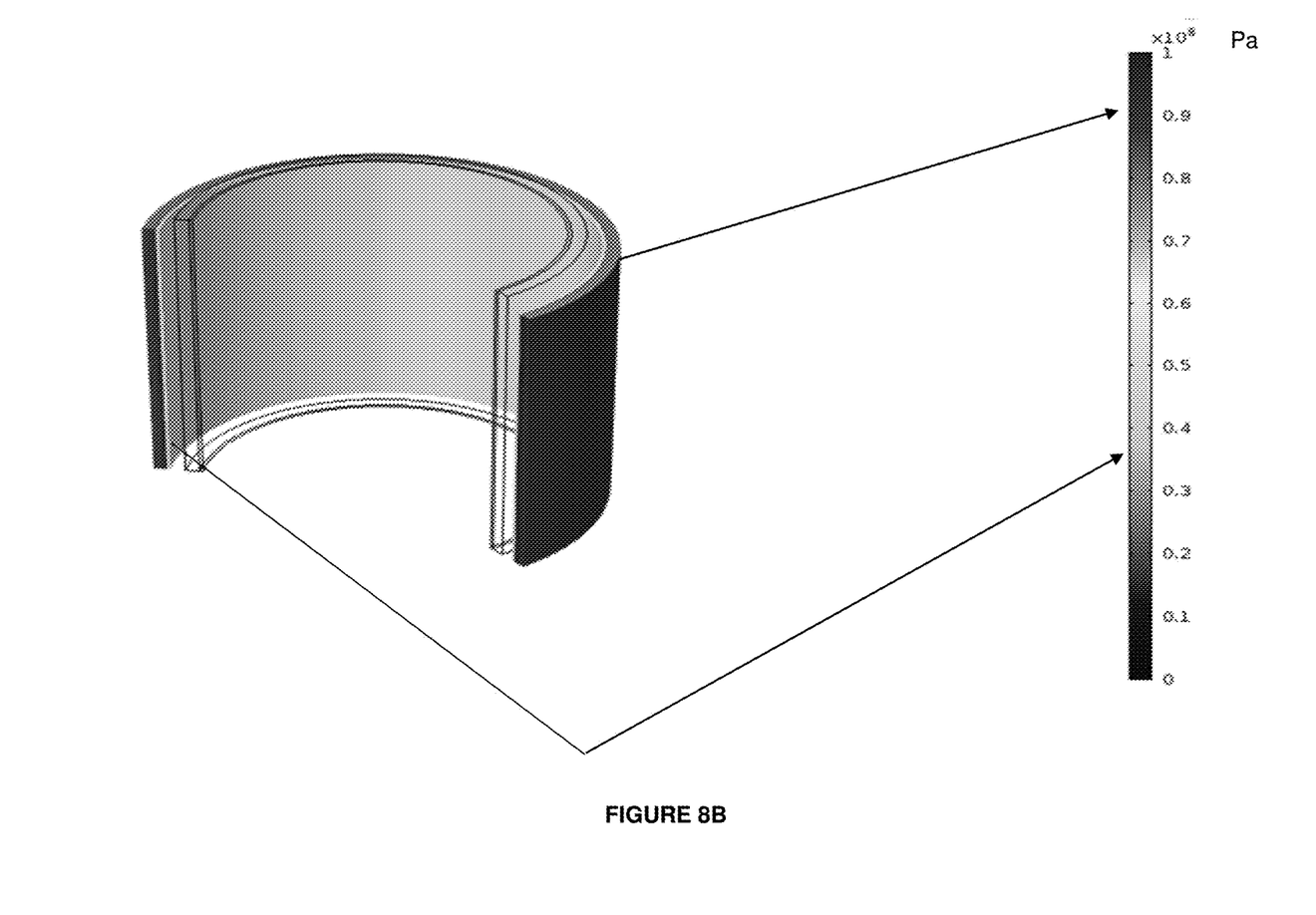
FIG. 8B is an image illustrating the von Mises stress calculated in an FEM simulation for a gas enclosure in accordance with the disclosure.

FIGS. 8A and 8B show the comparative results of the simulation. FIG. 8A is an illustration of the stress for the conventional refractory metal tube. FIG. 8A illustrates that the inner surface has slightly higher stress than the outer surface. FIG. 8B is an illustration of the stress for the tube in accordance with the disclosure. FIG. 8B shows that the inner metal layer has much lower stress than the CMC layer.

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict embodiments for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A gas enclosure, comprising:
   a refractory metal liner adapted to surround and enclose a gas to be contained;
   a ceramic matrix composite cladding; and
   a diffusion barrier layer disposed between the refractory metal liner and the ceramic matrix composite cladding.

2. The gas enclosure of claim 1, further comprising a corrosion protection layer disposed on the refractory metal liner and arranged on a surface of the refractory metal liner opposite the diffusion barrier layer.

3. The gas enclosure of claim 2, wherein the corrosion protection layer comprises one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, $(ZrO_2.SiO_2)$, $(ZrO_2.xY_2O_3)$.

4. The gas enclosure of claim 2, wherein the gas to be enclosed is a reactive gas.

5. The gas enclosure of claim 2, wherein the corrosion protection layer comprises alternating layers of a ceramic material and a metal material.

6. The gas enclosure of claim 1, wherein the refractory metal liner comprises one or more of Ti, Nb, Mo, Ta, W, Re, and laminates, and alloys thereof.

7. The gas enclosure of claim 1, wherein the refractory metal liner has a thickness of about 100 μm to about 500 μm.

8. The gas enclosure of claim 1, wherein the diffusion barrier layer comprises one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, $(ZrO_2.SiO_2)$, $(ZrO_2.xY_2O_3)$.

9. The gas enclosure of claim 1, wherein the diffusion barrier layer is deposited by atomic layer deposition, physical vapor deposition, chemical vapor deposition, surface reaction coating, electroplating, and cold/hot spraying.

10. The gas enclosure of claim 9, wherein the diffusion barrier layer is deposited by atomic layer deposition.

11. The gas enclosure of claim 1, wherein the diffusion barrier layer comprises alternating layers of a ceramic material and a metal material.

12. The gas enclosure of claim 1, wherein the diffusion barrier layer is substantially free of oxides.

13. The gas enclosure of claim 1, wherein the ceramic matrix composite cladding comprises one or more of SiC, C, $Al_2O_3$, $Al_2O_3SiO_2$, $SiN_3N_4$, SiC/SiC, C/SiC, C/C, SiC/C, $Al_2O/Al_2O_3$, and laminates and multilayers thereof.

14. The gas enclosure of claim 1, wherein the ceramic matrix composite cladding has a thickness of about 100 μm to about 2000 μm.

15. The gas enclosure of claim 1, wherein the gas enclosure is operable at temperatures in excess of 700° C. without cracking or spalling.

16. The gas enclosure of claim 1, wherein the gas enclosure is operable at temperatures up to 1400° C.

17. The gas enclosure of claim 1, wherein the gas to be enclosed is one or more of He, Ne, Ar, Kr, Xe, $CO_2$, $H_2$, and $O_2$.

18. The gas enclosure of claim 1, further comprising a high-conductivity joining layer disposed on an exterior surface of the ceramic matrix composite cladding.

19. A micro-reactor, comprising the gas enclosure of claim 1 enclosing a cooling gas.

20. A coolant channel comprising the gas enclosure of claim 1.

* * * * *